US012536873B2

(12) United States Patent
Boese et al.

(10) Patent No.: US 12,536,873 B2
(45) Date of Patent: Jan. 27, 2026

(54) GAMING DEVICE WITH A SECONDARY SPINS FEATURE

(71) Applicant: Aristocrat Technologies, Inc., Las Vegas, NV (US)

(72) Inventors: Eric Boese, Decatur, GA (US); Ronald Williams, II, Atlanta, GA (US); Alex Jagrowski, Dunwoody, GA (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 326 days.

(21) Appl. No.: 18/464,939

(22) Filed: Sep. 11, 2023

(65) Prior Publication Data

US 2024/0105018 A1 Mar. 28, 2024

Related U.S. Application Data

(60) Provisional application No. 63/409,426, filed on Sep. 23, 2022.

(51) Int. Cl.
*G07F 17/32* (2006.01)

(52) U.S. Cl.
CPC ...... *G07F 17/3267* (2013.01); *G07F 17/3213* (2013.01); *G07F 17/3244* (2013.01)

(58) Field of Classification Search
CPC ............. G07F 17/3267; G07F 17/3213; G07F 17/3244; G07F 17/34
USPC ............................................................ 463/30
See application file for complete search history.

(56) References Cited

U.S. PATENT DOCUMENTS 10,657,759 B2 5/2020 Berman
10,810,830 B2 10/2020 Lamb
10,867,467 B2 12/2020 Batsiokis
2021/0312756 A1* 10/2021 Penacho ............. G07F 17/3262
2023/0098777 A1* 3/2023 Cohn ...................... G07F 17/34 463/20
2023/0154287 A1* 5/2023 Bouvier .............. G07F 17/3211 463/20
2023/0237877 A1* 7/2023 Sanborn ................ G07F 17/326 463/25
2024/0087418 A1* 3/2024 Honeycutt .......... G07F 17/3213
2024/0105018 A1* 3/2024 Boese ................. G07F 17/3244
2024/0119794 A1* 4/2024 Tsombanidis ....... G07F 17/3213
2024/0144771 A1* 5/2024 Turner ................ G07F 17/3267

* cited by examiner

*Primary Examiner* — Pierre E Elisca
(74) *Attorney, Agent, or Firm* — Armstrong Teasdale LLP

(57) ABSTRACT

A gaming system including a processor and a memory storing instructions thereon which, when executed by the processor, cause the processor to: select symbols from reel strips stored in the memory for display in corresponding columns by determining stopping positions for the reel strips; cause display of the selected symbols in the columns on a display of a gaming device; determine that a trigger condition stored in the memory is satisfied based on the selected symbols; and in response to determining that the trigger condition is satisfied: replace one or more of the selected symbols in a group of symbol positions with an animation effect, the animation effect including display of a spin and stop sequence of credit values in the group of symbol positions; select a subset of the credit values; and cause display of the subset of credit values in the group of symbol positions.

20 Claims, 17 Drawing Sheets

502 504 506 508 510

| Symbol Position | Base Reel 1 | Base Reel 2 | Base Reel 3 | Base Reel 4 | Base Reel 5 |
|---|---|---|---|---|---|
| 1 | - | - | - | COR 4 | WILD |
| 2 | COR 1 | - | - | - | WILD |
| 3 | - | COR 2 | - | - | WILD |
| 4 | - | - | - | - | WILD |
| 5 | COR 1 | - | WILD | - | WILD |
| 6 | - | COR 2 | WILD | - | - |
| 7 | - | - | WILD | - | - |
| 8 | - | - | WILD | - | - |
| 9 | - | - | - | COR 4 | COR 5 |
| 10 | COR 1 | - | - | - | - |
| 11 | - | COR 2 | COR 3 | - | - |
| 12 | - | - | - | - | - |
| 13 | - | - | - | - | - |
| 14 | - | - | - | - | COR 5 |
| 15 | - | - | COR 3 | - | - |

FIG. 5

606 608 610

| Reel Position | Cash Reel 3 | Cash Reel 4 | Cash Reel 5 |
|---|---|---|---|
| 0 | 3G | 4G | 5G |
| 1 | 3N | 4N | 5G |
| 2 | 3G | 4G | 5G |
| 3 | 3G | 4G | 5N |
| 4 | 3G | 4G | 5G |
| 5 | 3G | 4G | 5G |
| 6 | 3N | 4N | 5N |
| 7 | 3N | 4N | 5N |
| 8 | 3G | 4G | 5G |
| 9 | 3G | 4G | 5N |
| 10 | 3N | 4N | 5G |
| 11 | 3G | 4G | 5G |
| 12 | 3G | 4G | 5N |
| 13 | 3N | 4N | 5G |
| 14 | 3G | 4G | 5G |
| 15 | 3N | 4N | 5G |

FIG. 6

700

702 704 706 708 710 712

| 3N | 3G | 4N | 4G | 5N | 5G |
|---|---|---|---|---|---|
| 100 | 100 | 500 | 100 | 1000 | 100 |
| 250 | 250 | 750 | 250 | 1500 | 250 |
| 400 | 300 | 1000 | 300 | 2000 | 300 |
| 500 | 400 | 1250 | 400 | 5000 | 400 |
| 750 | 500 | 2500 | 500 | 8000 | 500 |
| 1000 | 600 | 8000 | 600 | 10000 | 600 |
| 2500 | 750 | 50000 | 750 | 100000 | 750 |

FIG. 7

GAMING DEVICE WITH A SECONDARY SPINS FEATURE

CROSS-REFERENCE TO RELATED APPLICATION

This application claims priority to U.S. Provisional Patent Application No. 63/409,426, filed Sep. 23, 2022, the disclosure of which is hereby incorporated herein by reference in its entirety.

TECHNICAL FIELD

The field of disclosure relates generally to electronic gaming devices, systems and methods that provide a secondary spins feature outcome of a game.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

BRIEF DESCRIPTION

In one aspect, a gaming system including a processor and a memory is provided. The memory stores instructions thereon which, when executed by the processor, cause the processor to: select a plurality of symbols from a plurality of reel strips stored in the memory for display in a corresponding plurality of columns by determining stopping positions for the plurality of reel strips; cause display of the selected plurality of symbols in the plurality of columns on a display of a gaming device; determine that a trigger condition stored in the memory is satisfied based on the selected plurality of symbols; and in response to determining that the trigger condition is satisfied: replace one or more of the selected plurality of symbols in a group of symbol positions with an animation effect, the animation effect including display of a spin and stop sequence of a plurality of credit values in the group of symbol positions; select a subset of the plurality of credit values; and cause display of the subset of credit values in the group of symbol positions. The instructions may direct additional, less, or alternate functionality, including that discussed elsewhere herein.

In another aspect, a computer-implemented method for providing an electronic game is provided. The method includes selecting a plurality of symbols from a plurality of reel strips stored in a memory for display in a corresponding plurality of columns by determining stopping positions for the plurality of reels; causing display of the selected plurality of symbols in the plurality of columns on a display of a gaming device; determining that a trigger condition stored in the memory is satisfied based on the selected plurality of symbols; and in response to determining that the trigger condition is satisfied: replacing one or more of the selected plurality of symbols in a group of symbol positions with an animation effect, the animation effect including display of a spin and stop sequence of a plurality of credit values in the group of symbol positions; selecting a subset of the plurality of credit values; and causing display of the subset of credit values in the group of symbol positions. The method may include additional, fewer or alternate actions, including those discussed elsewhere herein.

In another aspect, a non-transitory computer-readable medium containing instructions embodied thereon is provided. The instructions, when executed by a processor, cause the processor to at least: select a plurality of symbols from a plurality of reel strips stored in a memory for display in a corresponding plurality of columns by determining stopping positions for the plurality of reels; cause display of the selected plurality of symbols in the plurality of columns on a display of a gaming device; determine that a trigger condition stored in the memory is satisfied based on the selected plurality of symbols; and in response to determining that the trigger condition is satisfied: replace one or more of the selected plurality of symbols in a group of symbol positions with an animation effect, the animation effect including display of a spin and stop sequence of a plurality of credit values in the group of symbol positions; select a subset of the plurality of credit values; and cause display of the subset of credit values in the group of symbol positions. The instructions may direct additional, less, or alternate functionality, including that discussed elsewhere herein.

BRIEF DESCRIPTION OF THE DRAWINGS

FIG. 5 is a schematic of an example base reel strip layout for use in the process of FIG. 4.

FIG. 6 is a schematic of an example cash reel strip layout for use in the process of FIG. 4.

FIG. 7 is a schematic of an example credit value table for use in the process of FIG. 4.

Corresponding reference numerals used through the drawings indicate corresponding elements.

DETAILED DESCRIPTION

Figure 1:
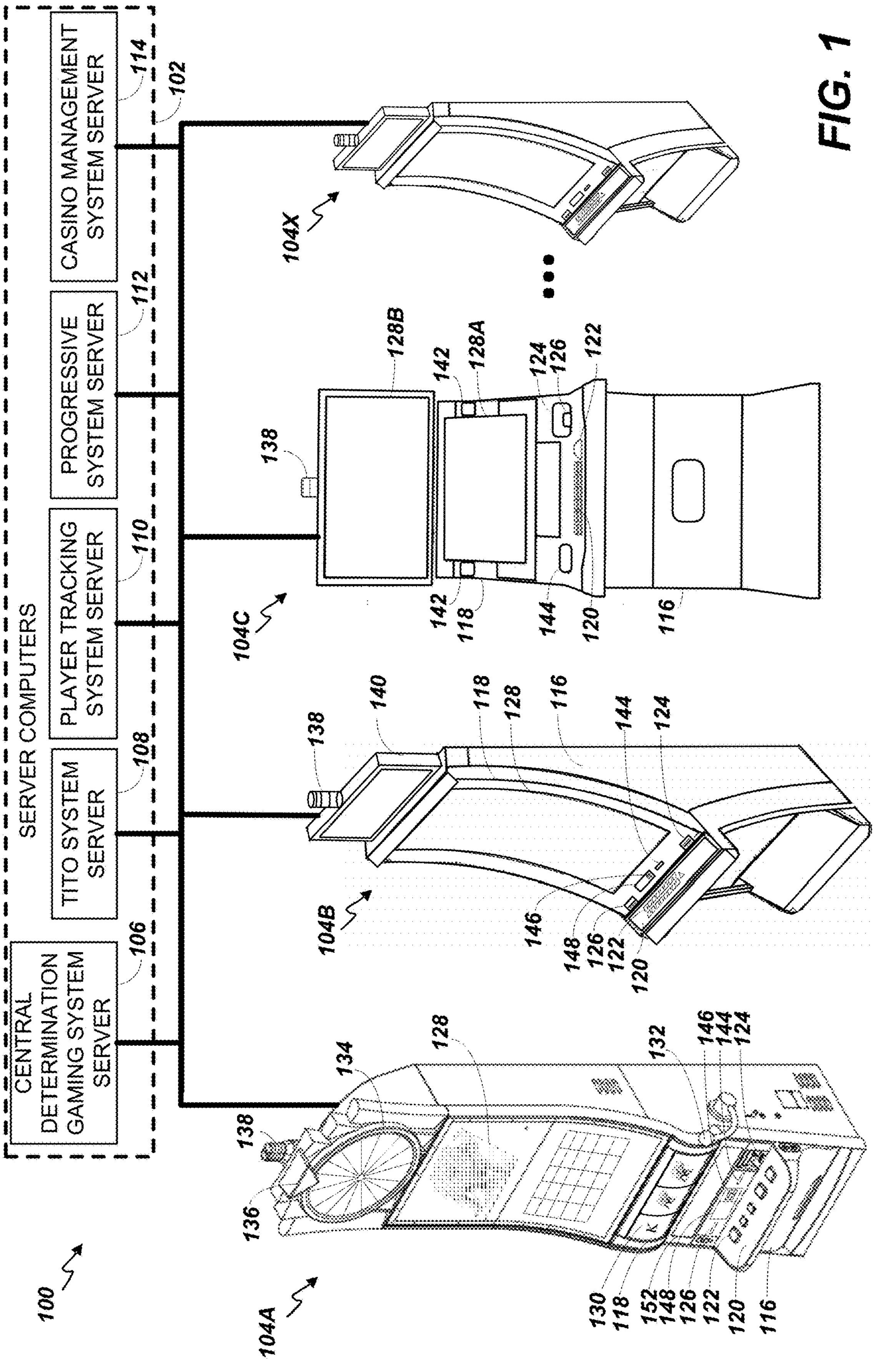
FIG. 1 is an exemplary diagram showing several gaming machines networked with various gaming related servers.

In conventional reel-based games, in a given game outcome, a gaming device may display one or more feature symbols or objects in a viewable portion of a set of reels (e.g., within a play area) along with other base symbols or objects. Feature symbols that appear in the play area may trigger a feature. Conventional features in reel-based games may include free spins, bonus games, expanding reels, additional symbols available for enhanced awards (e.g., multipliers or jackpot symbols), and the like. The variability and flexibility in providing features and awards based on outcomes of the features in conventional reel-based games remain limited, however. A need exists to address these limitations to facilitate increased variability in the game play while reducing or maintaining the computational resources used and while doing so during game play.

Example implementations described herein provide systems and methods for an electronic game that executes a respin feature based on one or more trigger conditions occurring during an initial spin or initial outcome of a game. A plurality of symbols are selected from a plurality of reel strips for display in a corresponding plurality of columns by determining stopping positions of the plurality of reel strips. The symbols are evaluated to determine whether a trigger condition is satisfied. If the trigger is satisfied, some of the selected symbols are replaced and a respin animation is displayed. The respin feature may include display of a spinning reel covering a subset or grouping of the initially displayed symbols, such as over a grouping of WILD symbols. The values may be provided in the spinning reel and stopping of the wheel indicates credit prizes or "cash on reel" prizes one or more of the symbol positions in the group. As a result, the gaming system of the present disclosure provides an improved variability for displaying an award by replacing a display of initial outcome symbols with the respin animation and resulting credit values.

Certain technical problems exist that are unique to the provision of an electronic game described herein in the example embodiments. For example, the ability to provide a respin feature as described herein, which includes activating a respin animation over select symbol positions within one or more columns as well as monitoring whether the respin feature is triggered and the symbol positions in which the respin feature is to be displayed, may require complex computations. Existing gaming devices may not be configured with the resources to perform these computations in an effective and/or efficient manner while also managing payout volatility and RTP. The systems and methods described herein include the provision of memory that stores reel strips, credit tables, and other information to enable the feature game to be played while maintaining or reducing the computational resources required. Furthermore, a user interface providing the respin feature game must be configured to display information and visual feedback related to the association between the symbol positions that are activated as part of the respin feature, and the effect that the outcome of the base game has on the respin feature, and to do so within a limited display area. The systems and methods described herein include display of visual indications that clearly indicate the status of the respin feature in the play area and visually inform progress of the respin feature.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
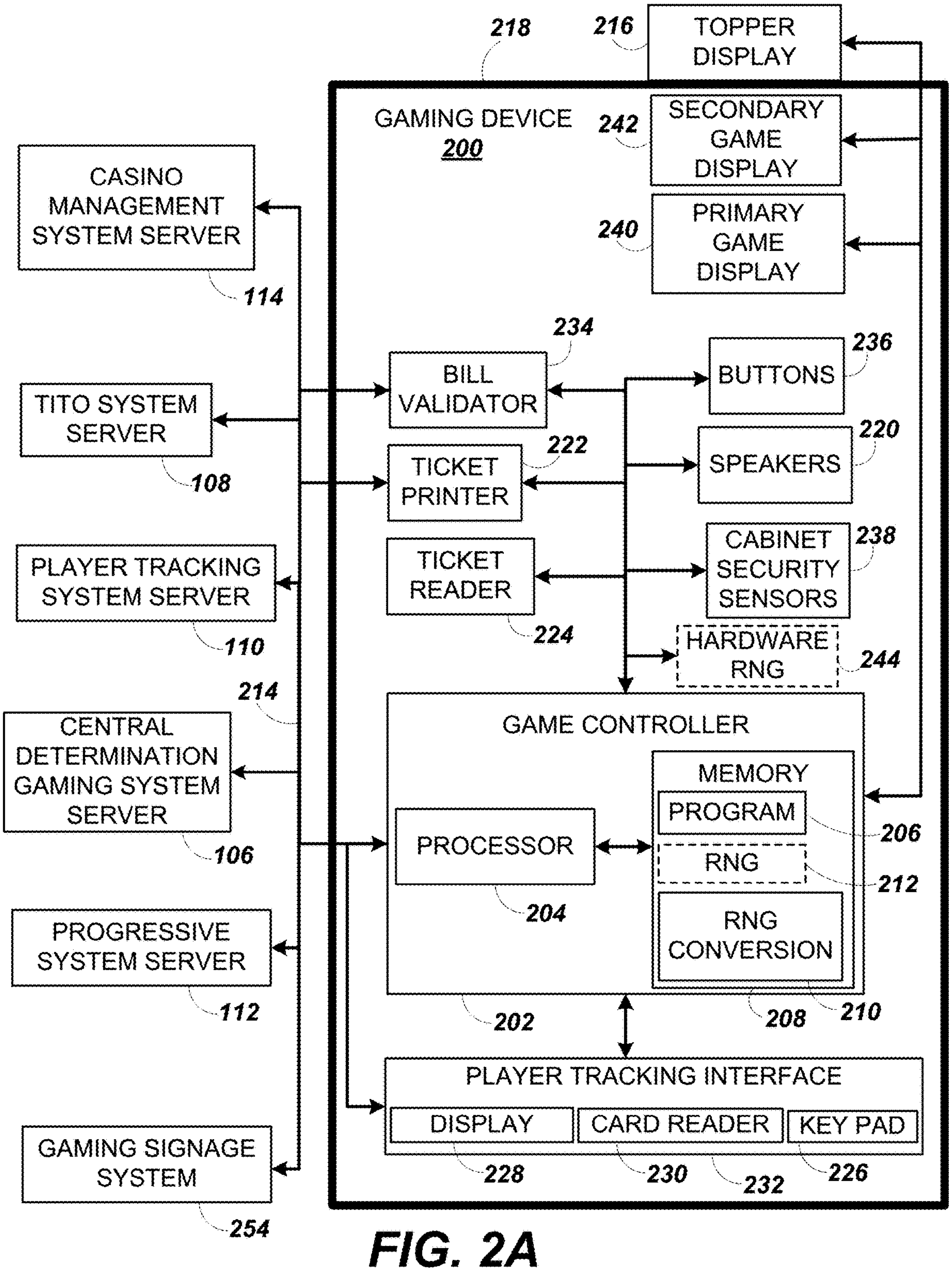
FIG. 2A is a block diagram showing various functional elements of an exemplary gaming machine.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
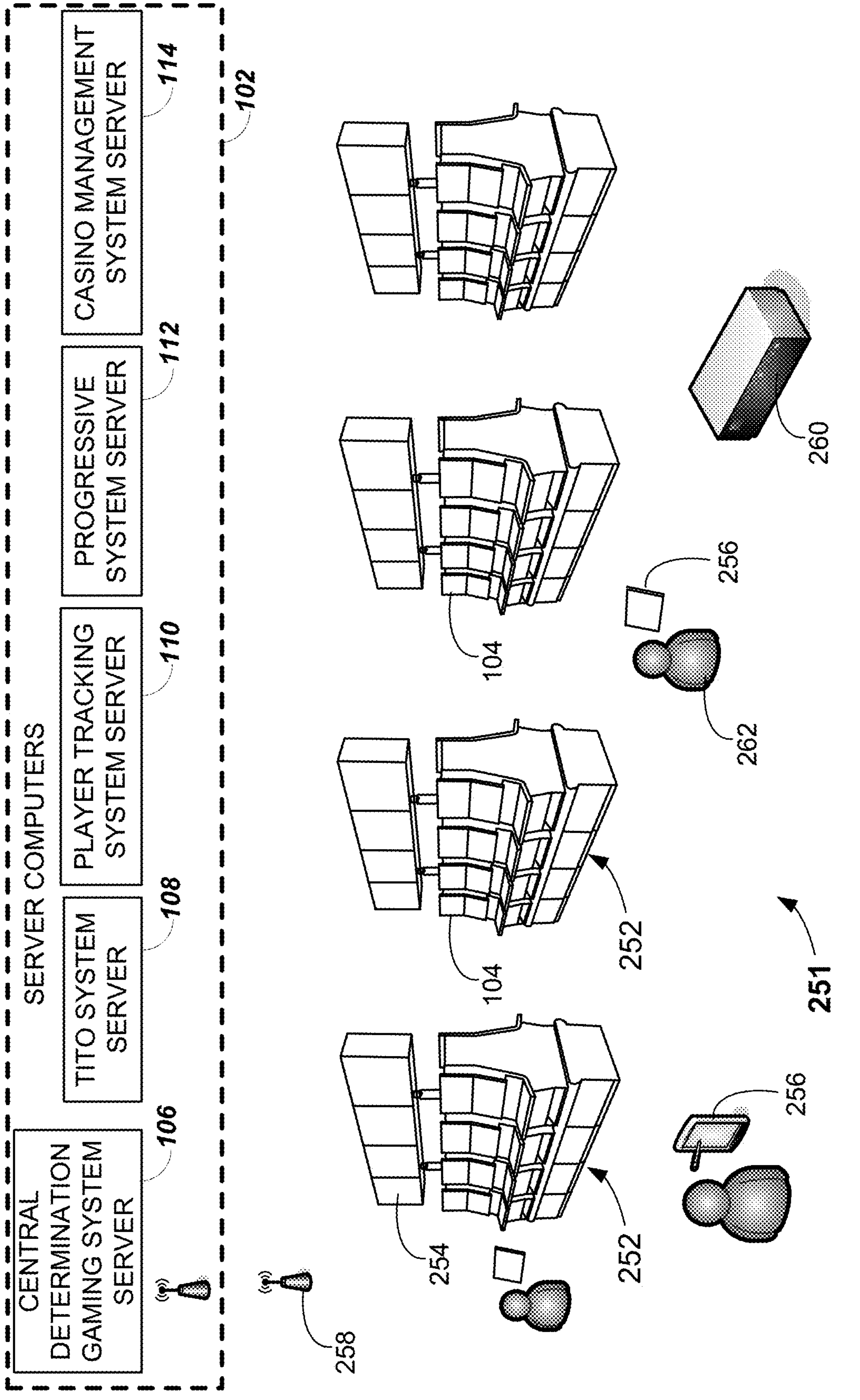
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
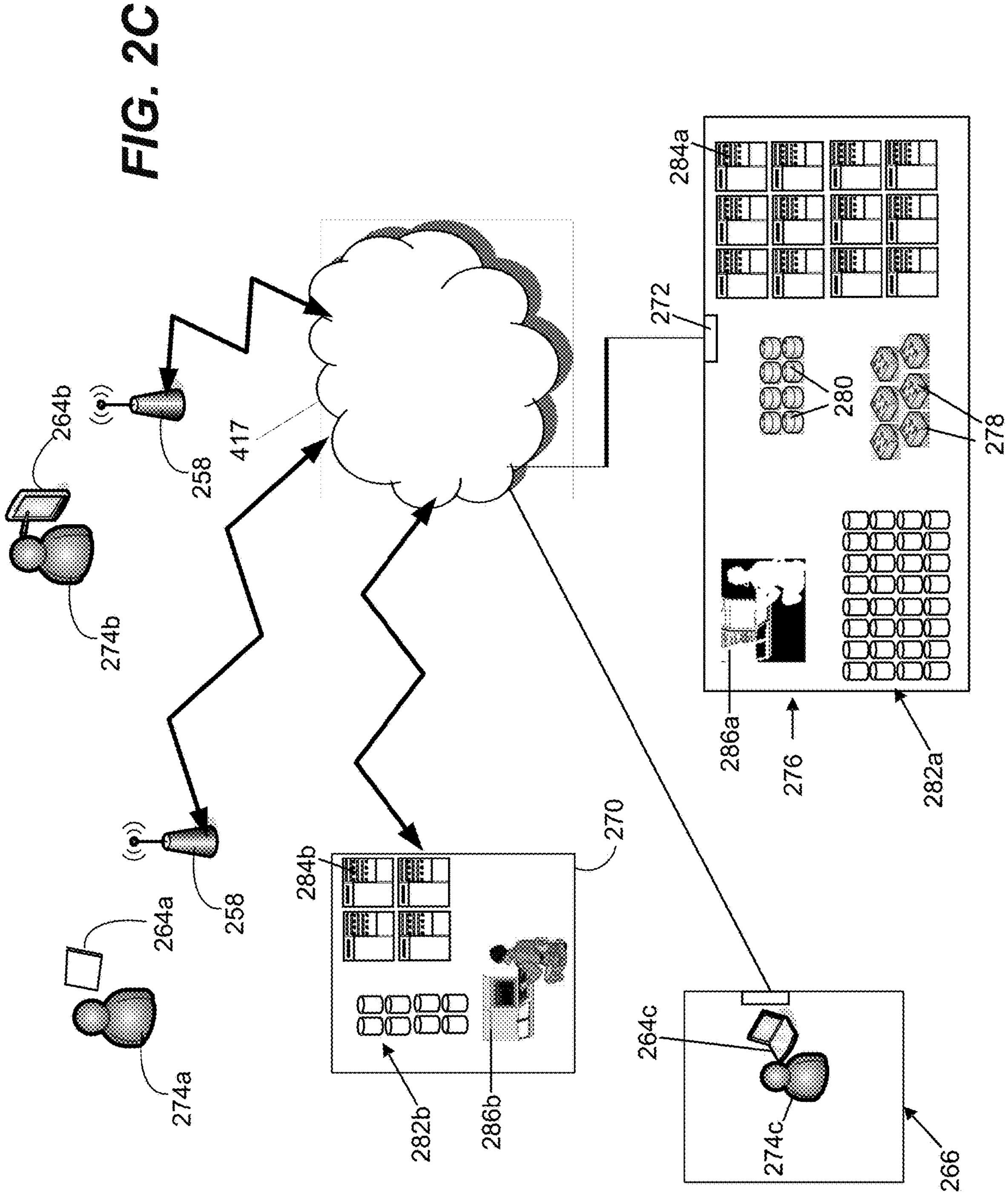
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 286*b*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
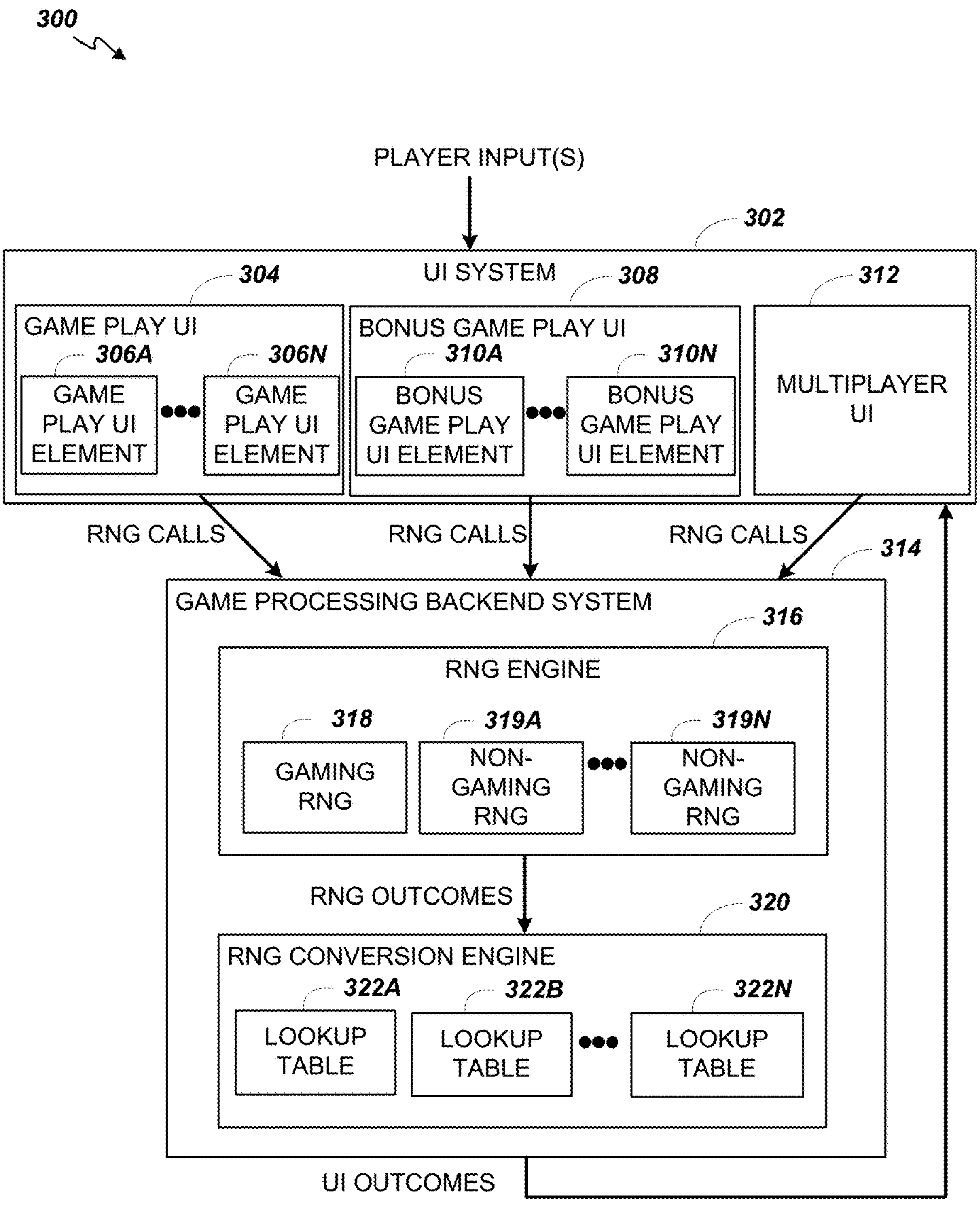
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4:
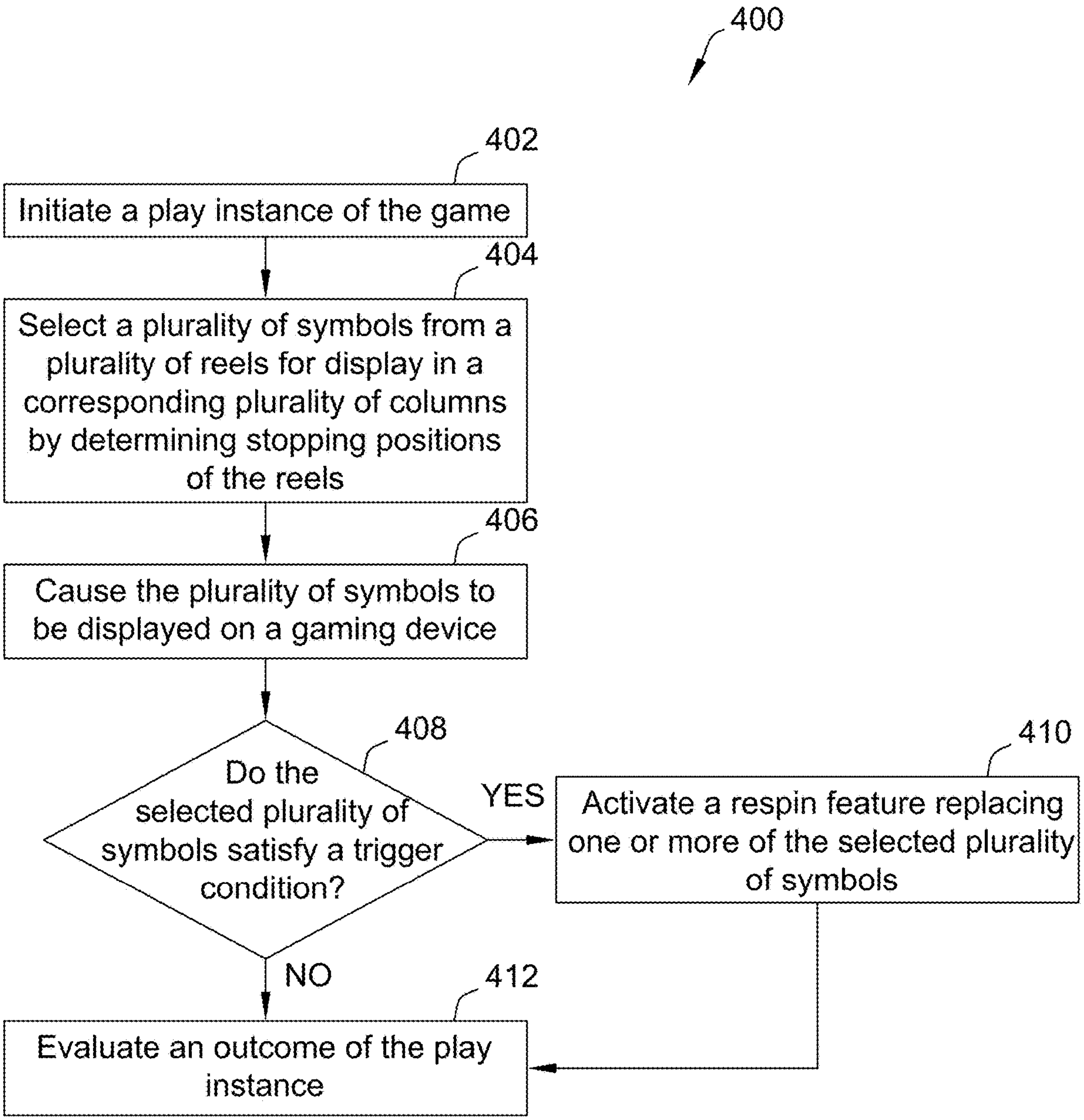
FIG. 4 is a flow chart of a process for executing a game instance of an electronic game for display to a user on a gaming device similar to the gaming device of FIG. 1.

FIG. 4 is a flow chart of an exemplary process 400 for executing electronic game play for display to a user. The process 400 may be implemented in a server (e.g., server 102) and/or a gaming device (e.g., gaming devices 104A-104X in FIG. 1, and/or gaming device 200 and/or mobile gaming device 256 in FIG. 2). For example, in an electronic gaming device, a game controller (e.g., game controller 202) includes one or more processors 204 operatively coupled to memory 208. The memory 208 can store one or more game programs 206 that provide program instructions and/or data for carrying out various implementations (e.g., game mechanics) that, when executed by the processor 204, cause the processor 204 to perform certain operations to perform the process 400.

At step 402, the processor 204 initiates a play instance of a game. In some embodiments, prior to initiating the play instance, the processor 204 first receives a selection of a bet option from the player, for example, via buttons 236. In an example, there are a plurality of bet options where bet1<bet2<bet3 etc.

Figure 8:
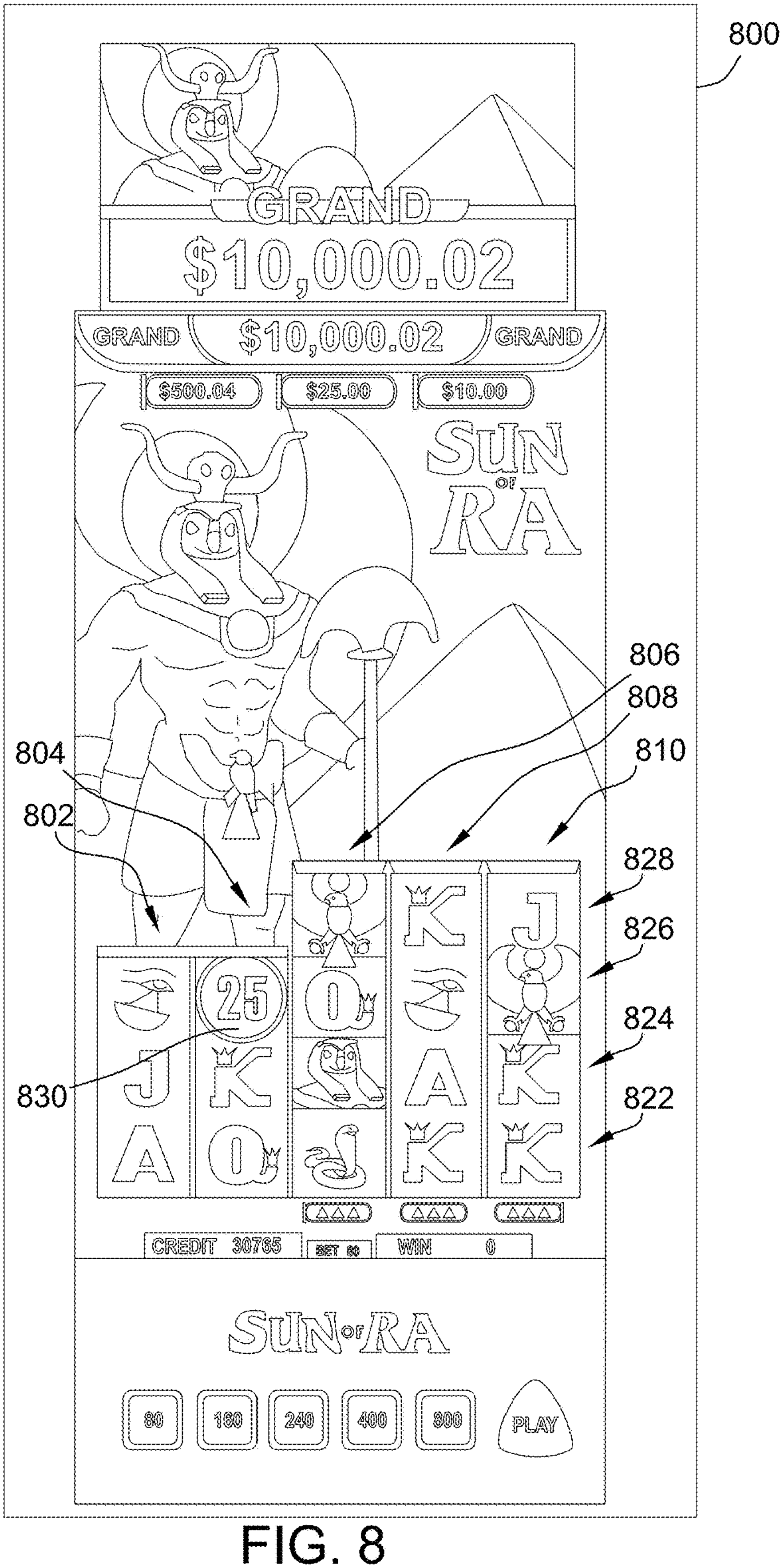
FIG. 8 is an example user interface or screen display showing display of an outcome of a first game instance according to the process of FIG. 4.

Step 402 may further include controlling a display, such as display 240, to display plurality of columns of symbol positions in a matrix. Referring to FIG. 8, which shows a display of the game play presented on a user interface (UI) 800 (e.g., a UI of the UI system 302, such as game play UI 304), in an example, there are five columns 802-810 of symbol positions. Additionally, a plurality of rows 822-828 are displayed in the symbol positions. In the example embodiment, first and second columns 802, 804 each include three rows 822-826, whereas the fourth and fifth columns 806-810 include four rows 822-828. In other embodiments, the columns 802-810 of symbol positions may have any suitable configuration, and the columns 802-810 may have the same number of rows or may have varying numbers of rows. For example, in some embodiments the plurality of columns of symbol positions may define a 3 by 5 matrix (i.e., five columns each having three rows).

As shown in FIG. 8, the game UI 800 is presented on a display, such as display 240 of an electronic gaming device 200. In other embodiments, the display may be provided on a mobile or remote device, such as a smart phone, tablet, computer, or any other suitable remote device. In some such embodiments, one or more of the steps of process 400 may be performed by one or more processors, such as a processor of the remote device and a processor of a central server in communication with the remote device.

Referring back to FIG. 4, at step 404, the processor 204 selects a plurality of symbols from a plurality of reels for display in the corresponding plurality of symbol position columns. In an example embodiment, the symbols are selected by selecting stopping positions for a plurality of base reel strips 502-510 (FIG. 5). Specifically, in response to initiating of the game play instance, processor 204 determines stopping positions for each base reel strip 502-510 of the plurality of base reels, based on one or more outcomes of an RNG. Based on the stopping positions, processor 204 selects a plurality of symbols from the base reel strips 502-510 and/or one or more lookup tables. At step 406, processor 204 causes the plurality of symbols to be displayed on the game UI 800 (FIG. 8).

FIG. 5 shows an example of a plurality of base reel strips 502-510 in accordance with the present disclosure. In the illustrated example, each base reel strip 502-510 has fifteen reel strip positions, though in other embodiments the base reel strips 502-510 may have any suitable number of reel strips positions, such as more or fewer than fifteen reel strip positions. Each reel strip position of each base reel strip has a symbol or lookup trigger therein. For example, a "WILD" symbol occupies the fifth symbol position of the third base reel strip 506.

A COR 1 symbol occupies the second symbol position of the first base reel strip 502. The COR 1 symbol is a lookup trigger symbol (or trigger value) that triggers the processor 204 to perform an additional lookup. The "COR" symbols are "cash on reel symbols" that display a value associated with the symbol. For example, referring to FIG. 8, a COR symbol 830 having a value of 25 credits is shown in the third row 826 of the second column 804. In some embodiments, each single appearance of a COR symbol 830 in an outcome evaluates to the value of credits shown on the COR symbol. In other examples, credit values of the COR symbols are awarded for an outcome of a game instance in which the COR symbols are displayed in combination with a predefined pattern (e.g., at least one COR symbol in each column).

Referring back to FIG. 5, in the example embodiment, base reel strips 502-510 each include a plurality of dynamic COR symbols that are specific to the associated reel. For example, base reel strip 502 (or Base Reel 1) includes a plurality of "COR 1" symbols, base reel strip 504 (or Base Reel 2) includes a plurality of "COR 2" symbols, etc. Each of the different COR symbols are dynamic, in that the value of the COR symbols are determined by the additional lookup in a lookup table separate from the stopping position determination. That is, values of the COR symbols for a given symbol position may change between game instances based on the additional lookup.

Each of the COR symbols for each reel strip 502-510 are associated with a corresponding credit table or paytable (not shown) stored in the memory 208. For example, the memory 208 stores a COR 1 table, a COR 2 table, a COR 3 table, etc. Each of the tables may include a plurality of different values for providing to the COR symbols. For example, the COR 5 table may include larger values or greater weighting for hitting larger values than the COR 1 table. In other embodiments, a single COR table may be used for determining the value of the COR symbols for each of the base reel strips 502-510.

Processor 204 determines values of the COR symbols based on a random selection from the corresponding COR table. For the present example, the processor 204 may determine the value for the COR symbol based on the additional lookup using a second output from the RNG. The processor 204 then selects a value from the associated COR 1 table based on the second RNG output. This process may then be repeated for each COR 1 symbols on the reels 502. Alternatively, another output of the RNG, such as the output used to select stopping positions of one or more of the reels, may be used to determine the value of the COR symbols. Additionally, in some embodiments, the processor 204 dynamically assigns a value to a COR symbol after determining that the COR symbol is included in the outcome of the game instance. In other embodiments, the COR symbols on one or more of the base reel strips may have static values (i.e., the values of the COR symbols do not change between game instances). In such embodiments, an additional lookup to determine the values of the COR symbols may not be necessary.

The dash symbols shown in FIG. 5 are schematic and refer to basic symbols included on the reel strips 502-510, such as one of the picture symbols or symbols J, Q, K, A as shown in FIG. 8 (i.e., non-WILD and non-COR symbols). In the example embodiment, the basic symbols and WILD symbols are fixed or static (i.e., they do not change values between different game instances). In other embodiments, at least some of the basic symbols and wild symbols may be dynamic and could become WILD symbols and/or COR symbols based, for example, on an output of an RNG at the initiation of a game instance or in response to some predefined trigger condition being satisfied.

Other reel strips to those illustrated in FIG. 5 may be used, for example, the base reel strips 502-510 could have between 30 and 100 reel strip positions or different numbers of strip positions from one another. The actual length of the base reel strips may depend on factors such as the number of WILD symbols and/or prize value associated with the WILD symbols. For example, the more WILD symbols there are in a given reel strip, the longer the reel strip needs to be to maintain the target RTP. Additionally, the higher the prize value associated with the WILD symbols, the longer the reel strip needs to be to lower the hit rate to maintain payout volatility and achieve the target RTP.

Referring back to FIG. 8, in the example embodiment, award credits for a given game instance are determined based on a "five of a kind" reel evaluation, under which credits are awarded if symbols of the same type and/or of the same value appear in each of the five columns 802-810. For example, as shown in FIG. 8, columns 804-810 each include a KING symbol. However, since column 802 does not include a KING symbol, there is not a "five of a kind pattern" of KING symbols and no credits are awarded. Moreover, in the example embodiment, a credit is only awarded from a COR symbol 830 if there is a five of a kind pattern of COR symbols 830 across the five columns 802-810, as shown in FIG. 9 for example.

Figure 9:
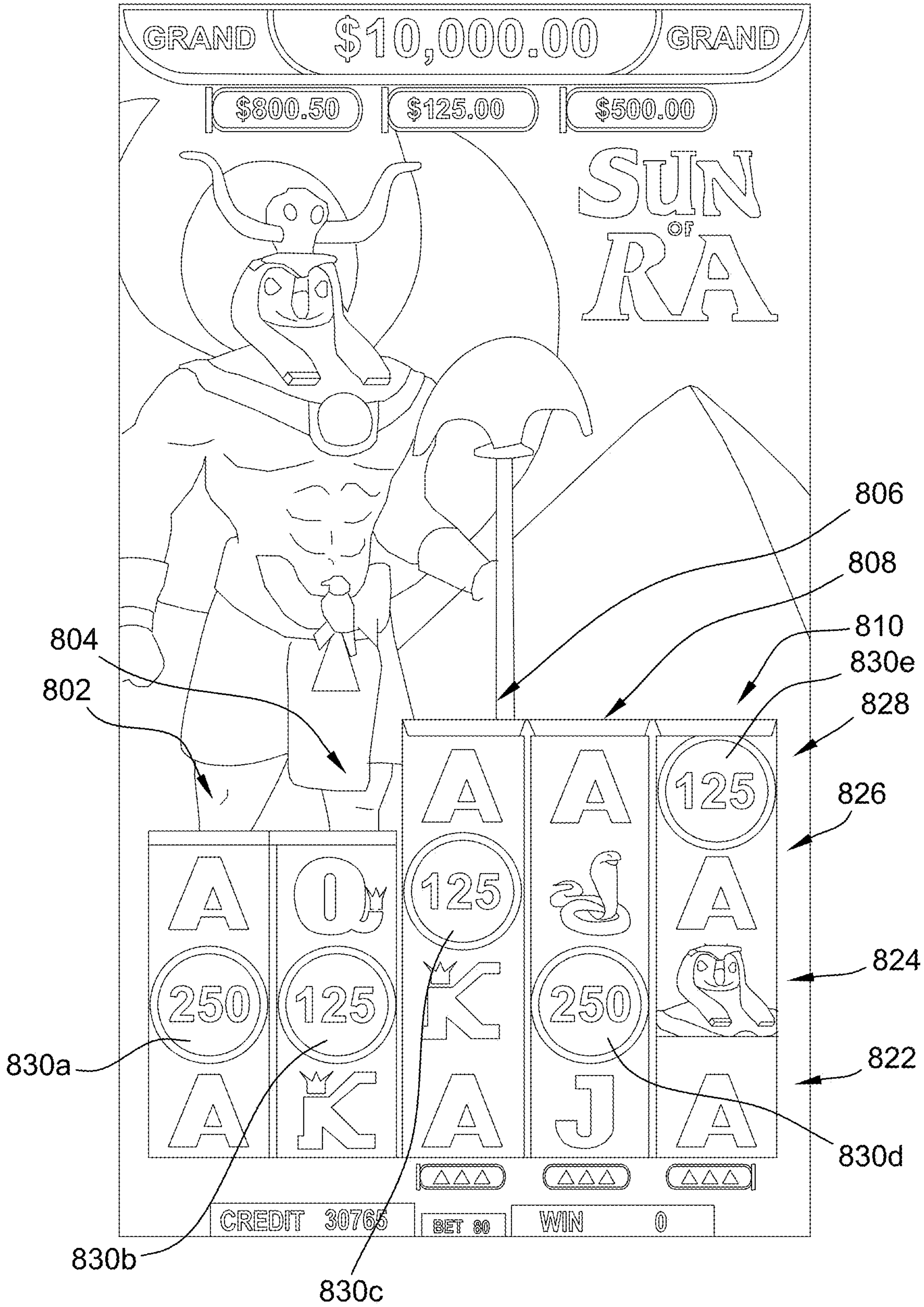
FIG. 9 is an example user interface or screen display showing display of an outcome of a second game instance according to the process of FIG. 4.

Referring to FIG. 9, in the example game outcome, columns 802-810 each include a COR symbol, evaluating to an award for the game instance shown in FIG. 9. Specifically, 875 credits are awarded to the player based on the outcome of the COR symbols 830*a*-830*e*, determined by summing the values of each of the displayed COR symbols 830*a*-830*e*.

Referring back to FIG. 4, at step 408, processor 204 determines whether the selected plurality of symbols satisfy a trigger condition. In some embodiments, the processor 204 may determine whether a plurality of trigger conditions are satisfied, as described in greater detail below. In the example embodiment, the trigger condition is satisfied based on both the presence of i) a "five of a kind" pattern of COR symbols; and ii) a full column of WILD symbols filling at least one of the columns 802-810. Each WILD symbol appearing in the outcome may be counted toward the five of a kind pattern of COR symbols. In other embodiments, any suitable outcome or pattern may provide the trigger condition. For example, in some embodiments the columns 802-810 may include one or more symbols which alone satisfy the trigger condition.

As shown in FIG. 9, the plurality of symbols selected responsive to the spin include a five of a kind pattern of COR symbols 830*a*-830*e*, but do not include a full column of wild symbols. That is, none of the columns 802-810 includes a WILD symbol in each row 822-828. Accordingly, referring back to FIG. 4, processor 204 determines at step 408 that the selected plurality of symbols do not satisfy the trigger condition, and the method proceeds to step 412 (shown in FIG. 4) in which an outcome of the play instance is evaluated.

If the processor 204 determines that the selected plurality of symbols satisfy the trigger condition, the method proceeds to step 410 and the processor 204 activates a "respin" feature of the game. For example, the respin feature may be activated in response to an outcome in which a five of a kind pattern of COR symbols 830 appears across the columns 802-810 and at least one of the columns 802-810 is filled with WILD symbols, that is, each symbol position in at least one of the columns 802-810 is populated with a WILD symbol. Other trigger conditions may exist, and the respin feature is not limited to being activated in response to the example trigger condition described with respect to the example embodiment of the electronic game.

Figure 12:
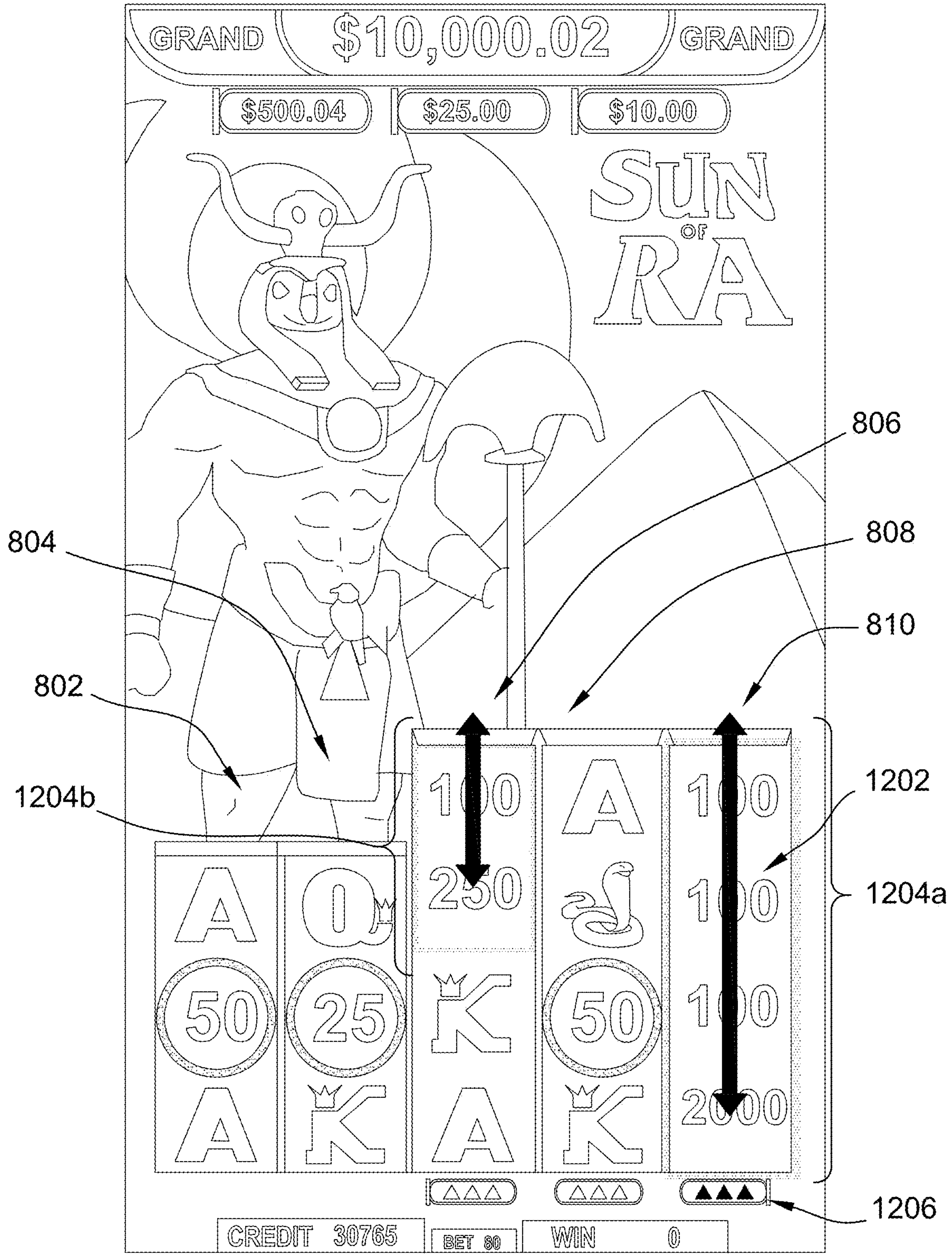
FIG. 12 is an example user interface or screen display showing a third display for the third game instance shown in FIG. 10.

During the respin feature, the processor 204 replaces one or more of the selected plurality of symbols within a group of symbol positions with a respin animation effect 1202 (shown in FIG. 12). The animation effect 1202 is displayed in the group of symbol positions (e.g., 1204*a* and 1204*b* in FIG. 12) and shows a plurality of credit values as moving or spinning over the group of symbol positions. The processor 204 further selects a subset of the plurality of credit values that are displayed and replaces the one or more selected plurality of symbols with the subset of credit values (e.g., in the form of a cash on reel symbol displaying the credit value).

Figure 10:
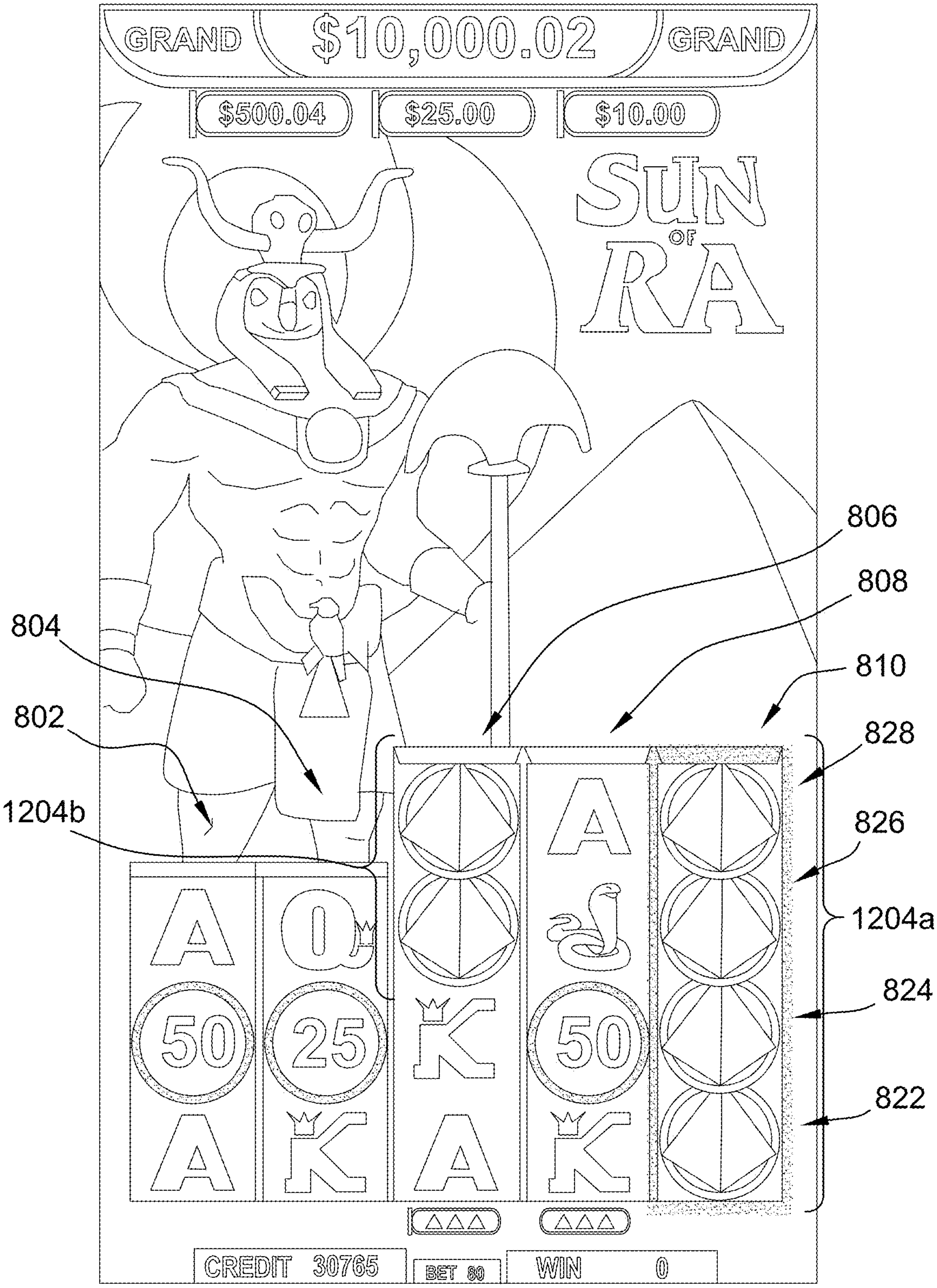
FIG. 10 is an example user interface or screen display showing a first display for a third game instance according to the process of FIG. 4.
Figure 11:
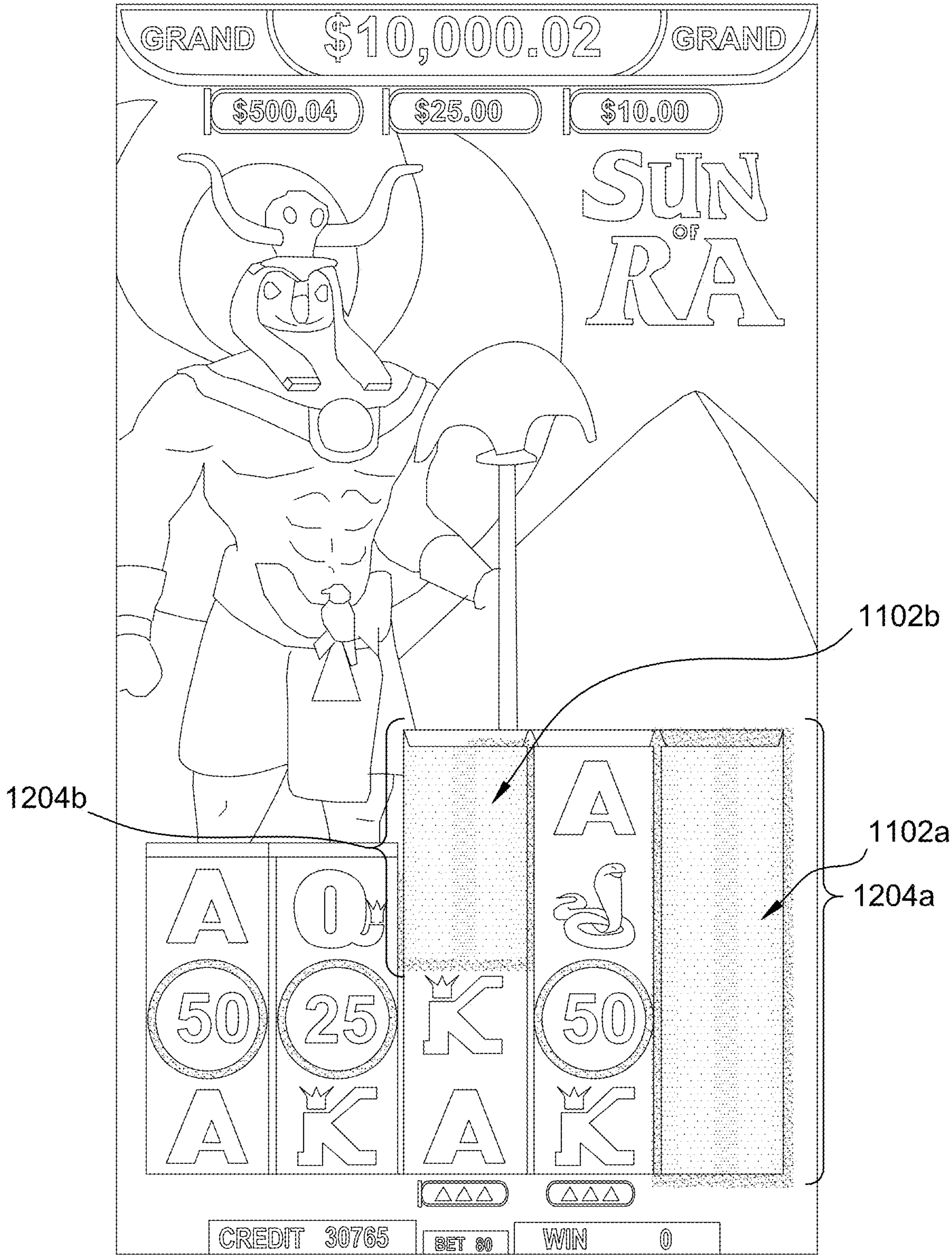
FIG. 11 is an example user interface or screen display showing a second display for the third game instance shown in FIG. 10.

For example, FIG. 10 shows a configuration of selected symbols which satisfies the trigger condition in the example embodiment. As shown in FIG. 10, the fifth column 810 is filled (i.e., fully populated in each of its symbol positions) with four WILD symbols, one in each row 822-828. The WILD symbols are pyramid symbols in the example embodiment. The five of a kind pattern of COR symbols across the columns 802-810 is satisfied by the three COR symbols appearing in columns 802, 804, 808, and the WILD symbols appearing in columns 806, 810 which are evaluated as COR symbols. Accordingly, in response to the trigger condition being satisfied, the respin feature is activated and the respin animation effect 1202 is displayed over one or more of the selected plurality of symbols within a group of symbol positions. In the example embodiment, the respin animation effect 1202 is displayed for each of the groups of symbol positions 1204*a* and 1204*b*. As shown in FIGS. 11 and 12, the groups of symbol positions 1204*a* and 1204*b* each constitute a stack of WILD symbols in columns 806 and 810, respectively, and the respin animation effect 1202 is displayed over the stacks of WILD symbols. In other embodiments, a respin animation effect 1202 may only be displayed over a stack of WILD symbols that fills up a column (e.g., the group 1204*a* in FIG. 12). In yet other embodiments, the respin animation effect 1202 may be displayed elsewhere (e.g., on other groups of symbol positions within any of the columns 802-810).

Referring to FIG. 11, display effects 1102*a*, 1102*b* are shown covering the stacks of WILDs in the groups of symbol positions 1204*a*, 1204*b*. The display effects 1102*a* and 1102*b* are each an intermediate, or transitional, animation displayed over the stacks of WILDS in the groups of symbol positions 1204*a* and 1204*b*. The display effects 1102*a* and 1102*b* visually indicate that the trigger condition is satisfied and the respin feature is activated. In the example embodiment the display effects 1102*a*, 1102*b* include graphics of sand falling over or burying the underlying stacks of WILD symbols in columns 806 and 810 (shown in FIG. 10).

As shown in FIG. 12, the WILD stacks from FIG. 10 in the groups of symbol positions 1204*a*, 1204*b* are replaced with value reels animations 1202, showing value reels that are spun independently from the other selected symbols. The value reels animations 1202 may be displayed after the intermediate display effects 1102*a* and 1102*b* that visually indicate that the trigger condition is satisfied. The vertical double ended arrows shown in FIG. 12 are schematic and indicate that the value reels are displayed as spinning, while the other reels and symbol positions are held constant. Each value reels animation 1202 includes a spin and stop sequence of a reel strip that includes a plurality of values or COR symbols including an associated credit value. The reel strips used during the value reels animation 1202 of the respin feature may be referred to as cash reel strips (e.g., cash reel strips 606-610 described below with reference to FIG. 6). The cash reel strips displayed during the respin feature may be stored in memory 208 and may be predetermined or randomly selected for use during the respin feature. For example, cash reel strip(s) may be stored in memory 208 and associated with each column in which a stack of WILD symbols may appear (columns 806-810 in the example embodiment). Upon the occurrence of one or more stacks of WILD symbols, in conjunction with the trigger condition being satisfied, processor 204 may query memory 208 for the cash reel strips to be used based on the columns in which stacks of WILD symbols appear. Additionally and/or alternatively, processor 204 may randomly select cash reel strips to be used during the respin feature based, for example, on one or more outputs of an RNG generated in response to the respin feature being triggered. A single RNG output may be used to determine the cash reel strip for each stack of WILD symbols, or a separate RNG output may be generated for each stack of WILD symbols.

Figure 13:
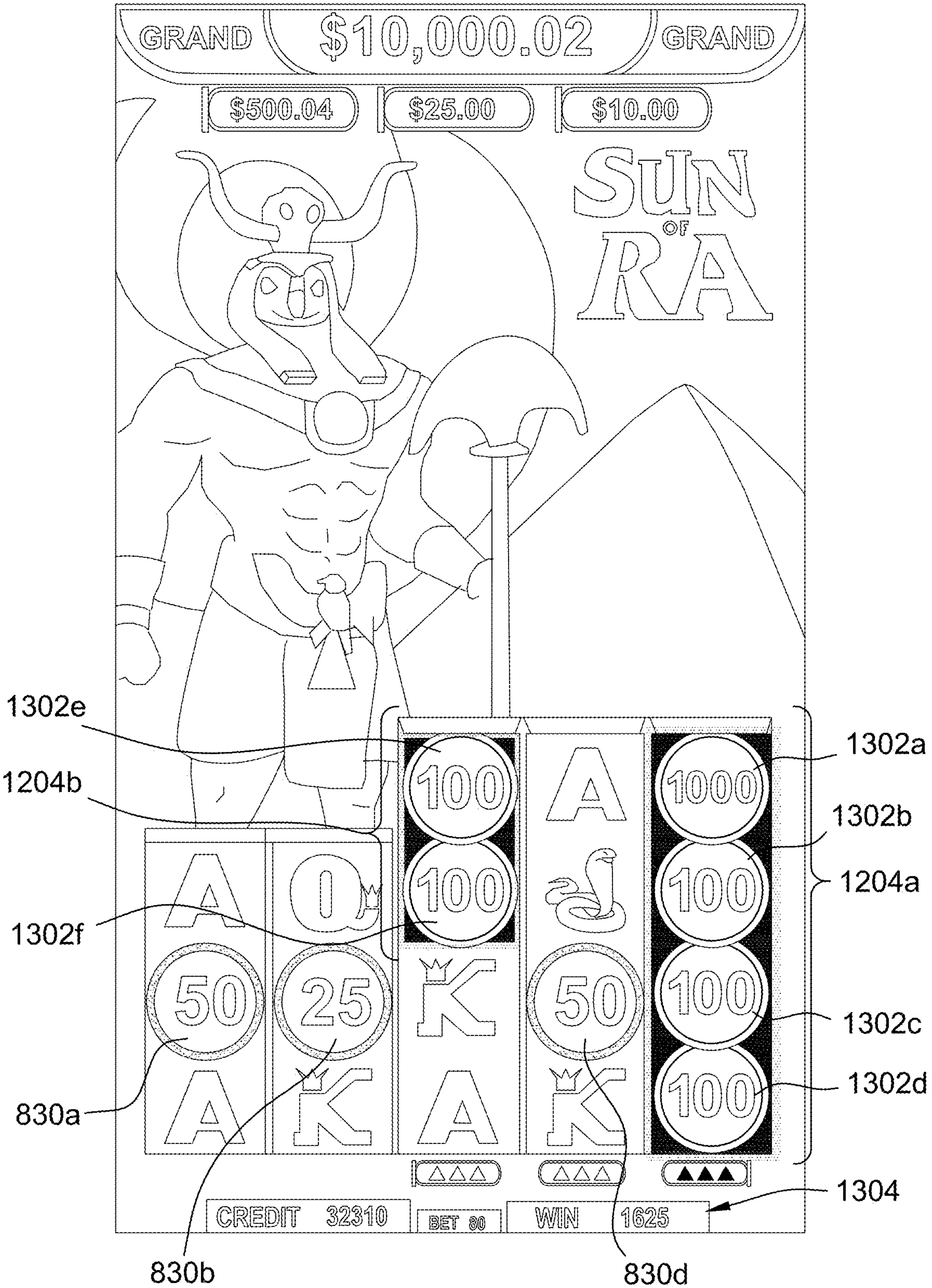
FIG. 13 is an example user interface or screen display showing a fourth display for the third game instance shown in FIG. 10.

FIG. 13 depicts an outcome of the value reels animation 1202 in which cash reel strips are spun and stopped over the respective stacks of WILD symbols. Respin COR symbols 1302*a*-1302*f* are shown in each of the groups of symbol positions 1204*a*, 1204*b*. Each of the respin COR symbols 1302*a*-1302*f* includes a credit value displayed therein. After the cash reel strips are spun and stopped, processor 204 evaluates, at step 412 of the process 400 (FIG. 4), the outcome of the game instance based on the total value of all credits displayed in the COR symbols and respin COR symbols 1302*a*-1302*f*, as well as any other winning symbol combinations and/or winning symbols that appear in the outcome of the game instance. A win meter 1304 is then updated to display the determined awarded credits (e.g., 1625 credits as shown in FIG. 13), and the credits are awarded to the player (e.g., by increasing a credit balance of the player by the number of credits shown in the win meter 1304).

In the example embodiment, the processor 204 determines values for the respin COR symbols 1302*a*-1302*f* by selecting stopping positions of a plurality of cash reel strips 606-610 (shown in FIG. 6). In particular, referring to FIG. 6, the cash reel strips 606-610 are used for the respin feature and are separate reels from the base reels 502-510 shown in FIG. 5. Processor 204 randomly selects stopping positions for each of the cash reel strips 606-610 (e.g., using an RNG output).

The cash reel strips 606-610 are stored in memory 208 and are used to replace groups of symbol positions in columns when the respin feature is activated. Any number of cash reel strips 606-610 may be included depending on a desired randomness of the respin feature. In the example embodiment, three cash reel strips 606-610 are included, and more or fewer than three cash reel strips may be included in other examples. Each cash reel strip 606-610 may be associated with one of the columns 806-810. For example, during the respin feature, the cash reel strip 606 may be used to replace stacks of WILD symbols in the column 806, the cash reel strip 608 may be used to replace stacks of WILD symbols in the column 808, and the cash reel strip 610 may be used to replace stacks of WILD symbol in the column 810. Alternatively, processor 204 may randomly select (e.g., based on an RNG output) a cash reel strip 606-610 for replacing a group of symbol positions occurring in each of the columns 806-810 during the respin feature. For example, the processor 204 may randomly select a cash reel strip 606-610 for each of the groups of symbol positions 1204*a*, 1204*b*.

In the example embodiment, cash reel strips 606-610 contain dynamic symbols (3G, 3N, 4G, 4N, 5G, 5N) that may change between game instances in a similar manner as described above with respect to the COR symbols provided on the base reel strips 502-510. Each of the symbols provided in the cash reel strips 606-610 is associated with a corresponding credit column 702-710 of a credit value table 700, as shown in FIG. 7. Processor 204 determines a credit value for each respin COR symbol using the credit table 700 associated with the dynamic symbol in the selected stopping position in the cash reel strip 606-610.

For example, referring to FIG. 13, to determine the credit value for the respin COR symbol 1302*a* to be provided in the fourth row of the fifth column, processor 204 selects a stopping reel position for the fifth cash reel strip 610. In the example embodiment, the symbols provided in each cash reel strip 606-610 indicate to processor 204 which column 702-712 of the credit table 700 should be used to determine a credit value for the respin COR symbol. To illustrate, if processor 204 selects stopping position 12 for the fifth cash reel strip 610, the value for respin COR symbol is selected using the credit table 710, shown in FIG. 7, which corresponds to the symbol "5N" appearing in reel position 12 for the fifth cash reel strip 610. In the example embodiment, two symbols are provided in each reel strip, each corresponding to a different column of the credit table 700. Thus, in the example embodiment, the credit table 700 includes six columns 702-712. Any number of credit columns may be included in the credit table 700, which may depend on the number of cash reel strips that are used for the respin feature.

In the example embodiment, the different credit columns 702-712 corresponding to the symbols included in each of the cash reel strips 606-610 are generally associated with differences in the size and likelihood of the credit values. For example, as shown in FIG. 7, the credit values for the 5N credit column 710 in the credit table 700 are increased relative to the credit values for the 5G credit column 712. Correspondingly, the cash reel strip 610 includes more instances of the 5G symbol than the 5N symbol. Similar rules may apply for the 3G and 3N symbols in the cash reel strip 606 and the credit values in the 3N credit column 702 and the 3G credit column 704, as well as for the 4G and 4N symbols in the cash reel strip 608 and the credit values in the 4N credit column 706 and the 4G credit column 708. Use of the different columns 702-712 in the credit table 700 for determining the respin COR values provides increased variability and flexibility in the possible outcomes or award combinations that may be generated by processor 204 and displayed on the UI 800 during the respin feature.

Referring back to the example, where the processor 204 selects the stopping position corresponding to the 5N symbol in the cash reel strip 610, the processor 204 then determines one of the credit values stored in the credit column 710 of the credit table 700, which corresponds to the 5N symbol. The processor 204 may randomly select one of the values from the 5N credit column 710 based on an output of the RNG (and optionally weightings, as described below). Where the output of the RNG corresponds to the first row of the 5N credit column 710, a credit value of 1000 is selected for the respin COR value 1302*a*, as shown in FIG. 13. This process is repeated for each of the respin COR symbols 1302*b*-1302*f* that appear in the outcome of the game instance (e.g., six symbols in FIG. 13).

In the example embodiment, weightings are used in combination with the respective reels and tables (shown in FIGS. 5-7) for the selection of base reel stopping position, credit values associated with COR symbols appearing in an outcome of the base game, stopping positions for cash reel strips in the respin feature, and/or credit values associated with respin COR symbols (determined using the credit table 700). As an example, the cash reel strips 606-610 are each weighted to increase a probability that the symbol associated with the relatively lower value credit column in the table 700 is selected. The cash reel strip 606 includes more instances of the 3G symbol, associated with the relatively lower value credit column 704, the cash reel strip 608 includes more instances of the 4G symbol, associated with the relatively lower value credit column 708, and the cash reel strip 610 more instances of the 5G symbol, associated with the relatively lower value credit column 712. In other embodiments, one or more of the tables and/or reels may be evaluated without weightings for the respective selections. For example, in some embodiments, the cash reel strips 606-610 are not weighted and the chances of selecting either symbol may be substantially the same. The values stored in the corresponding credit columns of the credit table 700 may be adjusted accordingly. In other embodiments, other weightings may be used alternatively or in addition to the weighted cash reel strips 606-610.

Referring to FIG. 12, in the example embodiment, the game includes a persistence feature that is activated by the processor 204 in response to the selected symbols including a full stack of WILD symbols in one of the columns 806-810. As shown in FIG. 12, persistence meters 1206 are provided beneath each of the third through fifth columns 806-810 to visually indicate activation of the persistence features. Since the game outcome included a full stack of WILD symbols in the fifth column 810 (shown in FIG. 10), the persistence feature is activated by processor 204. In response to the persistence feature being activated, the processor 204 causes display of WILD symbols in each of the symbol positions of the fifth column 810 for a number of subsequent game instances. Activation of the persistence feature is indicated by display of a full persistence meter 1206 beneath the column 806-810 in which the stacked WILD symbols will persist. The number of game instances over which the persistence feature remains active is also indicated by the persistence meter 1206. In the example embodiment, as shown in FIG. 12, the persistence meter 1206 beneath the fifth column 810 is filled with three pyramid symbols, indicating that the persistence feature is activated and the WILD symbols will persist in the symbol positions of the fifth column 810 for three game instances. To visually indicate the number of game instances remaining in the persistence feature, the number of pyramid symbols displayed in the persistence meter may decrement after each game instance. The persistence feature is particularly beneficial in the example embodiment, since it guarantees that one of the two necessary outcomes (e.g., i) filled column of WILD symbols; and ii) five of a kind pattern) to trigger the respin feature will occur in each game instance while the persistence feature is active.

Moreover, in the example embodiment, a free spins feature game may be triggered during play of the base game. In some embodiments the free spins game is triggered based on an outcome of the base game, a predefined symbol pattern, the presence of a triggering symbol, a predetermined number of wagers, or any other suitable trigger. The respin feature may be activated during the free spins feature game in substantially the same manner as described with above with respect to the base game.

Figure 14:
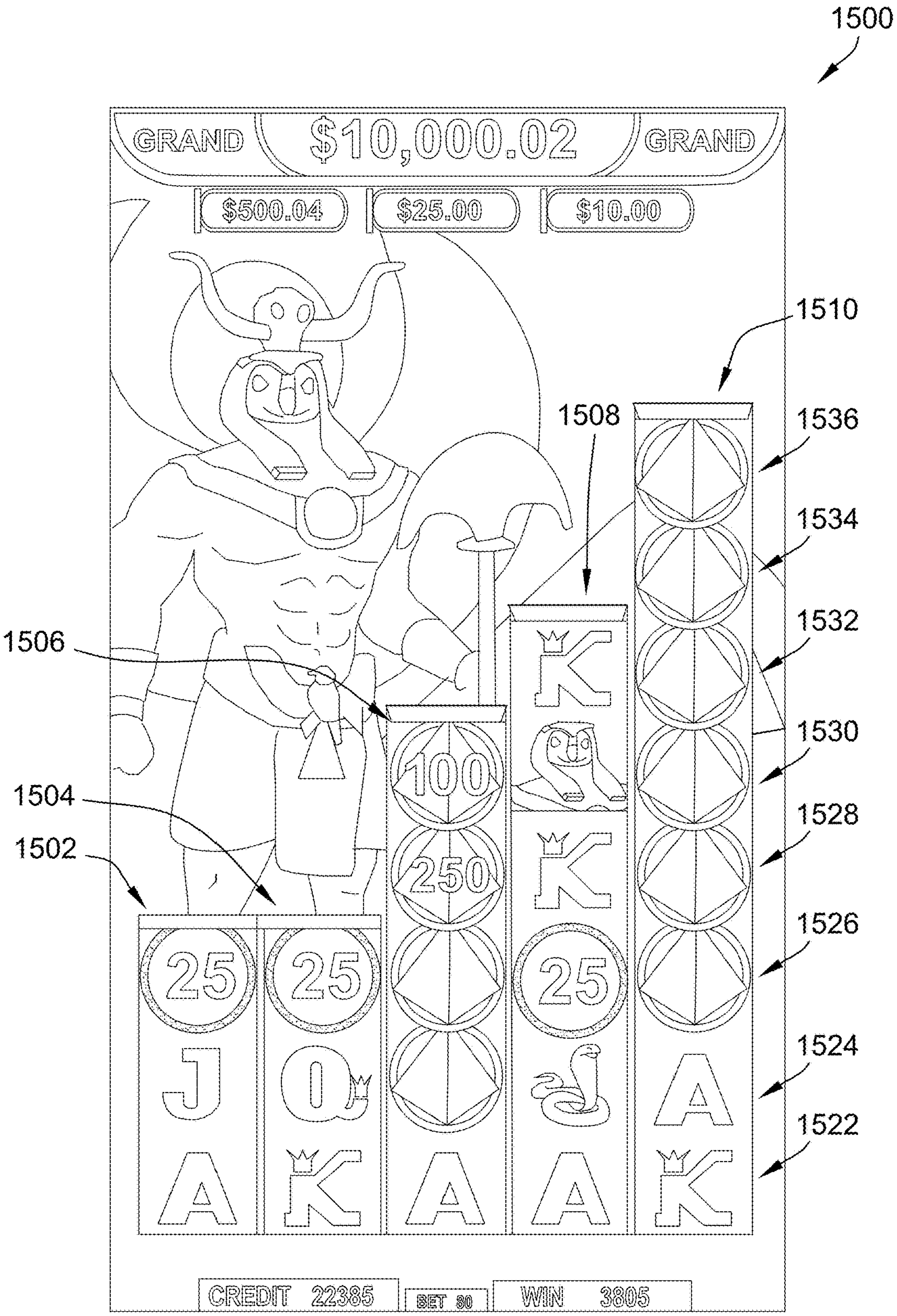
FIG. 14 is an example user interface or screen display showing a first display for a fourth game instance according to the process of FIG. 4.
Figure 15:
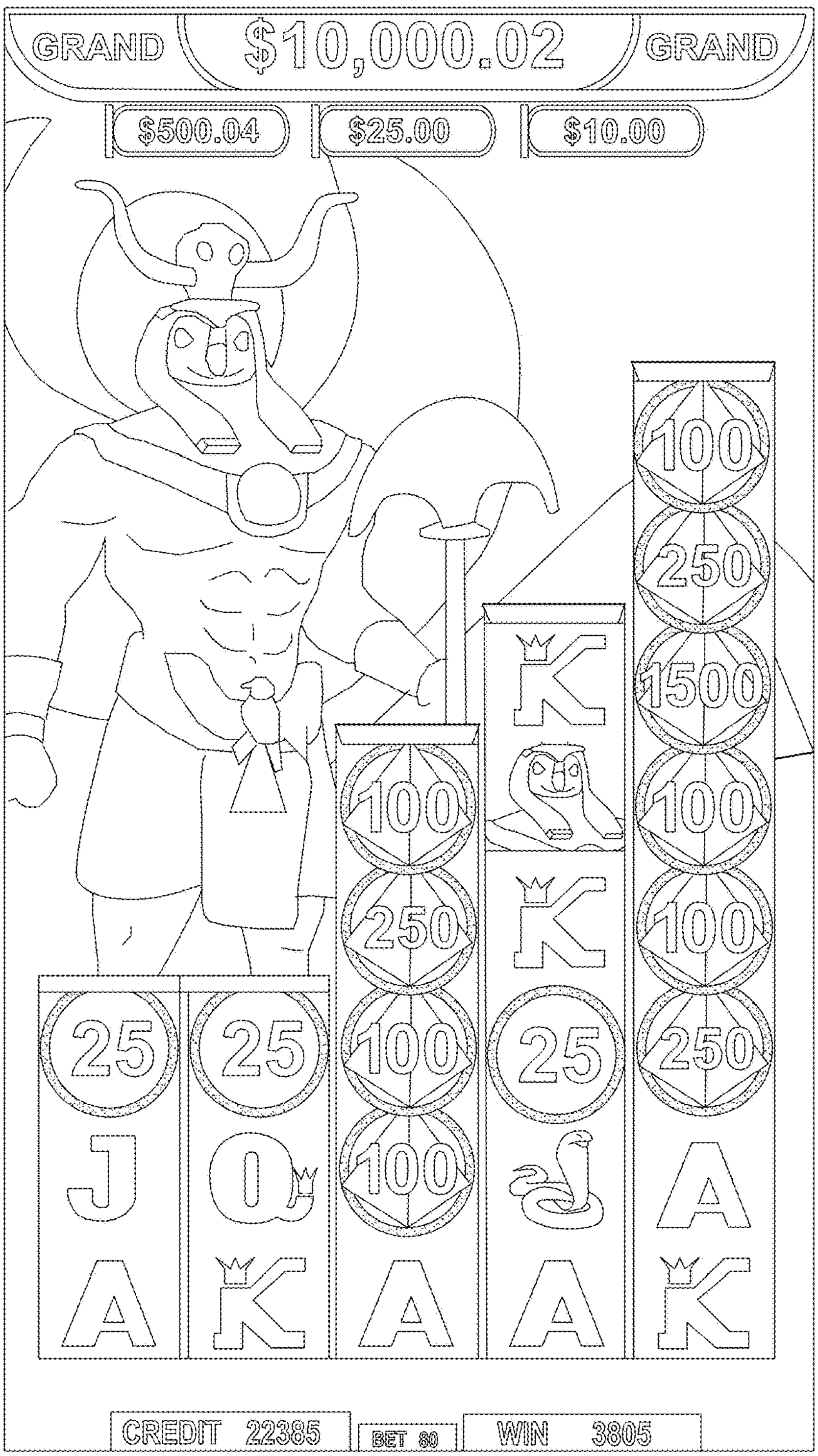
FIG. 15 is an example user interface or screen display showing a second display for the fourth game instance shown in FIG. 14.

FIGS. 14 and 15 show play of an example free spins feature game. The free spins feature game may include an expanding reels feature. In the example embodiment, row heights of the third, fourth, and fifth columns 1506-1510 are increased from the base game to provide increased payouts to the player by providing a greater number of ways to win. The third column 1506 is expanded to have five rows 1522-1530, the fourth column 1508 is expanded to have six rows 1522-1532, and the fifth column 1510 is expanded to have 1522-1536 rows. In other examples, the columns 1506-1510 may be expanded to include any number of rows that are increased relative to the base game. The expanded columns 1506-1510 may have the same or different numbers of rows during the free spins feature game. Additionally and/or alternatively, the expanded reels feature of the free spins feature game may include one or more additional columns being displayed.

In the example embodiment, different base reel strips, cash reel strips, and credit tables are used during play of the free spins feature game from the base reel strips, cash reel strips, and credit tables used during the base game. For example, a fifth free spins base reel strip used for the column 1510 may include eight stacked wilds to enable triggering the respin feature during the free spins feature game. Additionally, the free spins feature game incorporates the persistence feature described above with respect to the base game except that, when activated during the free spins feature game, the persistence feature persists until the free spins feature game has ended (e.g., a number of awarded free spins has been used). A free spins counter (not shown) may be displayed in conjunction with the free spins feature game to visually indicate a number of free spins that are awarded during the free spins feature game. The free spins counter may decrement after each free spin to visually indicate a number of free spins remaining during the free spins feature game.

As shown in FIG. 15, in the example free spins feature game outcome, a five of a kind pattern of COR symbols is presented. However, while the third column 1506 includes four WILD symbols and the fifth column 1510 includes six WILD symbols, no column is fully stacked with WILD symbols. Accordingly, the respin feature is not activated in response to the outcome shown in FIG. 15. However, since the five of a kind pattern was achieved in the outcome, the processor 204 evaluates the outcome by assigning COR credit values to each of the WILD symbols, without activating the respin feature. In some embodiments, the COR credit values are assigned to the WILD symbols in substantially the same manner as described above with respect to the respin COR symbols, except that the animation of the respin is not shown. For example, in some such embodiments the cash reel strips 606-610 and credit table 700 are used to determine the COR credit values to assign to the WILD symbols that appear during an outcome of the free spins feature game. In other embodiments, the COR credit values may be assigned to the WILD symbols based on a predetermined credit award for the outcome of the free spins feature game, or any other suitable method. As shown in FIG. 15, COR credit values are assigned to each of the WILD symbols and an award total including the sum of all the COR values (2925 credits in the example) as well as any award value associated with any other winning symbol combinations and/or winning symbols that appear in the outcome of the free spins feature game, is provided.

Exemplary technical effects of the methods, systems, and apparatus described herein include at least one of: (a) improved display variability by providing a respin animation after an initial outcome of a base game is shown; and (b) improved control over payout volatility and a return to player during a respin feature by storing in memory respin reel strips incorporating dynamic symbols.

A computer, controller, or server, such as those described herein, includes at least one processor or processing unit and a system memory. The computer, controller, or server typically has at least some form of computer readable non-transitory media. As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits "configured to" carry out programmable instructions, and these terms are used interchangeably herein. In the embodiments described herein, memory may include, but is not limited to, a computer-readable medium or computer storage media, volatile and nonvolatile media, removable and non-removable media implemented in any method or technology for storage of information such as computer readable instructions, data structures, program modules, or other data. Such memory includes a random access memory (RAM), computer storage media, communication media, and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As indicated above, the process may be embodied in computer software. The computer software could be supplied in a number of ways, for example on a tangible, non-transitory, computer readable storage medium, such as on any nonvolatile memory device (e.g., an EEPROM). Further, different parts of the computer software can be executed by different devices, such as, for example, in a client-server relationship. Persons skilled in the art will appreciate that computer software provides a series of instructions executable by the processor.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A gaming system comprising:
- a processor; and
- a memory storing instructions thereon which, when executed by the processor, cause the processor to:
  - select a plurality of symbols from a plurality of reel strips stored in the memory for display in a corresponding plurality of columns by determining stopping positions for the plurality of reel strips;
  - cause display of the selected plurality of symbols in the plurality of columns on a display of a gaming device;
  - determine that a trigger condition stored in the memory is satisfied based on the selected plurality of symbols; and
  - in response to determining that the trigger condition is satisfied:
    - replace one or more of the selected plurality of symbols in a group of symbol positions with an animation effect, the animation effect including display of a spin and stop sequence of a plurality of credit values in the group of symbol positions;
    - select a subset of the plurality of credit values; and
    - cause display of the subset of credit values in the group of symbol positions.

2. The gaming system of claim 1, wherein the processor determines that the trigger condition is satisfied based, at least in part, on the selected plurality of symbols including a stack of WILD symbols that fully populates at least one of the plurality of columns.

3. The gaming system of claim 1, wherein the plurality of reel strips is a plurality of base reel strips including a plurality of fixed symbols and a plurality of lookup trigger symbols, wherein the memory stores a plurality of cash reel strips different from the plurality of base reel strips.

4. The gaming system of claim 3, wherein the processor determines that the trigger condition is satisfied based, at least in part, on the selected plurality of symbols including one of the plurality of lookup trigger symbols for display in a symbol position of each of the plurality of columns.

5. The gaming system of claim 3, wherein the processor selects the subset of the plurality of credit values based on a lookup of at least one of the plurality of cash reel strips.

6. The gaming system of claim 3, wherein the instructions, when executed by the processor, further cause the processor to:

determine a stopping position of a first base reel strip of the plurality of base reel strips for display in a corresponding first column of the plurality of columns;

identify a lookup trigger symbol on the first base reel strip associated with the stopping position of the first base reel strip;

perform a lookup in a credit table associated with the lookup trigger symbol; and select a first credit value, based on the lookup, for display in a symbol position of the first column.

7. The gaming system of claim 3, wherein the plurality of cash reel strips includes a plurality of identifiers each corresponding to a different set of credit values in a credit value table stored in the memory, and wherein the plurality of credit values for the animation effect is the set of credit values corresponding to one of the plurality of identifiers selected by the processor in response to determining that the trigger condition is satisfied.

8. The gaming system of claim 7, wherein the processor randomly selects the one of the plurality of identifiers in response to determining that the trigger condition is satisfied to determine the plurality of credit values for the animation effect by performing a first lookup of the plurality of cash reel strips.

9. The gaming system of claim 8, wherein the subset of the plurality of credit values is a subset of the set of credit values in the credit value table, wherein the processor selects the subset of the plurality of credit values by performing a second lookup of the credit value table based on the selected one of the plurality of identifiers.

10. The gaming system of claim 9, wherein identifiers of the plurality of identifiers corresponding to relatively lower value sets of credit values have a greater probability of being selected by the first lookup.

11. The gaming system of claim 1, wherein the replaced one or more of the plurality of symbols in the group of symbol positions is a stack of WILD symbols, and wherein the animation effect includes display of an intermediate animation over the stack of WILD symbols prior to display of the spin and stop sequence of the plurality of credit values to visually indicate that the trigger condition is satisfied.

12. The gaming system of claim 1, wherein the display of the selected plurality of symbols in the corresponding plurality of columns is a first base game outcome, and wherein the display of the subset of credit values in the group of symbol positions persists for at least one subsequent base game outcome.

13. A computer-implemented method for providing an electronic game, the method comprising:

selecting a plurality of symbols from a plurality of reel strips stored in a memory for display in a corresponding plurality of columns by determining stopping positions for the plurality of reels;

causing display of the selected plurality of symbols in the plurality of columns on a display of a gaming device;

determining that a trigger condition stored in the memory is satisfied based on the selected plurality of symbols; and in response to determining that the trigger condition is satisfied:

replacing one or more of the selected plurality of symbols in a group of symbol positions with an animation effect, the animation effect including display of a spin and stop sequence of a plurality of credit values in the group of symbol positions;

selecting a subset of the plurality of credit values; and causing display of the subset of credit values in the group of symbol positions.

14. The method of claim 13, wherein determining that the trigger condition is satisfied comprises determining at least one of:

that the selected plurality of symbols includes a stack of WILD symbols that fully populates at least one of the plurality of columns; and that the selected plurality of symbols includes a lookup trigger symbol for display in a symbol position of each of the plurality of columns.

15. The method of claim 13, further comprising:

determining a stopping position of a first base reel strip of the plurality of reel strips for display in a corresponding first column of the plurality of columns;

identifying a lookup trigger symbol on the first base reel strip associated with the stopping position of the first base reel strip;

performing a lookup in a credit table associated with the lookup trigger symbol; and selecting a first credit value, based on the lookup, for display in a symbol position of the first column.

16. The method of claim 13, wherein the plurality of reel strips includes a plurality of base reel strips and a plurality of cash reel strips different from the plurality of base reel strips, wherein the plurality of cash reel strips includes a plurality of identifiers each corresponding to a different set of credit values in a credit value table stored in the memory, and wherein the method further comprises:

selecting one of the plurality of identifiers in response to determining that the trigger condition is satisfied, wherein the identifier is selected by performing a first lookup of the plurality of cash reel strips;

using the set of credit values corresponding to the selected identifier as the plurality of credit values for the animation effect;

performing a second lookup of the credit value table based on the selected identifier to select a subset of the set of credit values corresponding to the selected identifier; and using the selected subset of the set of credit values corresponding to the selected identifier as the subset of the plurality of credit values displayed in the group of symbol positions.

17. A non-transitory computer-readable medium containing instructions embodied thereon, which when executed by a processor, cause the processor to at least:

select a plurality of symbols from a plurality of reel strips stored in a memory for display in a corresponding plurality of columns by determining stopping positions for the plurality of reels;

cause display of the selected plurality of symbols in the plurality of columns on a display of a gaming device;

determine that a trigger condition stored in the memory is satisfied based on the selected plurality of symbols; and in response to determining that the trigger condition is satisfied:

replace one or more of the selected plurality of symbols in a group of symbol positions with an animation effect, the animation effect including display of a spin and stop sequence of a plurality of credit values in the group of symbol positions;

select a subset of the plurality of credit values; and cause display of the subset of credit values in the group of symbol positions.

18. The non-transitory computer-readable medium of claim 17, wherein the instructions, when executed, further cause the processor to determine that the trigger condition is satisfied by determining at least one of:

that the selected plurality of symbols includes a stack of WILD symbols that fully populates at least one of the plurality of columns; and that the selected plurality of symbols includes a lookup trigger symbol for display in a symbol position of each of the plurality of columns.

19. The non-transitory computer-readable medium of claim 17, wherein the instructions, when executed, further cause the processor to:

determine a stopping position of a first base reel strip of the plurality of reel strips for display in a corresponding first column of the plurality of columns;

identify a lookup trigger symbol on the first base reel strip associated with the stopping position of the first base reel strip;

perform a lookup in a credit table associated with the lookup trigger symbol; and select a first credit value, based on the lookup, for display in a symbol position of the first column.

20. The non-transitory computer-readable medium of claim 17, wherein the plurality of reel strips includes a plurality of base reel strips and a plurality of cash reel strips different from the plurality of base reel strips, wherein the plurality of cash reel strips includes a plurality of identifiers each corresponding to a different set of credit values in a credit value table stored in the memory, and wherein the instructions, when executed, further cause the processor to:

select one of the plurality of identifiers in response to determining that the trigger condition is satisfied, wherein the identifier is selected by performing a first lookup of the plurality of cash reel strips;

use the set of credit values corresponding to the selected identifier as the plurality of credit values for the animation effect;

perform a second lookup of the credit value table based on the selected identifier to select a subset of the set of credit values corresponding to the selected identifier; and use the selected subset of the set of credit values corresponding to the selected identifier as the subset of the plurality of credit values displayed in the group of symbol positions.

* * * * *